Inventor:
Arthur H. Maynard
By
Attorneys.

April 2, 1940.     A. H. MAYNARD     2,195,889
FASTENER-APPLYING DEVICE
Filed Dec. 7, 1937     5 Sheets-Sheet 2

Inventor:
Arthur H. Maynard
By
Attorneys.

April 2, 1940. A. H. MAYNARD 2,195,889
FASTENER-APPLYING DEVICE
Filed Dec. 7, 1937 5 Sheets-Sheet 3
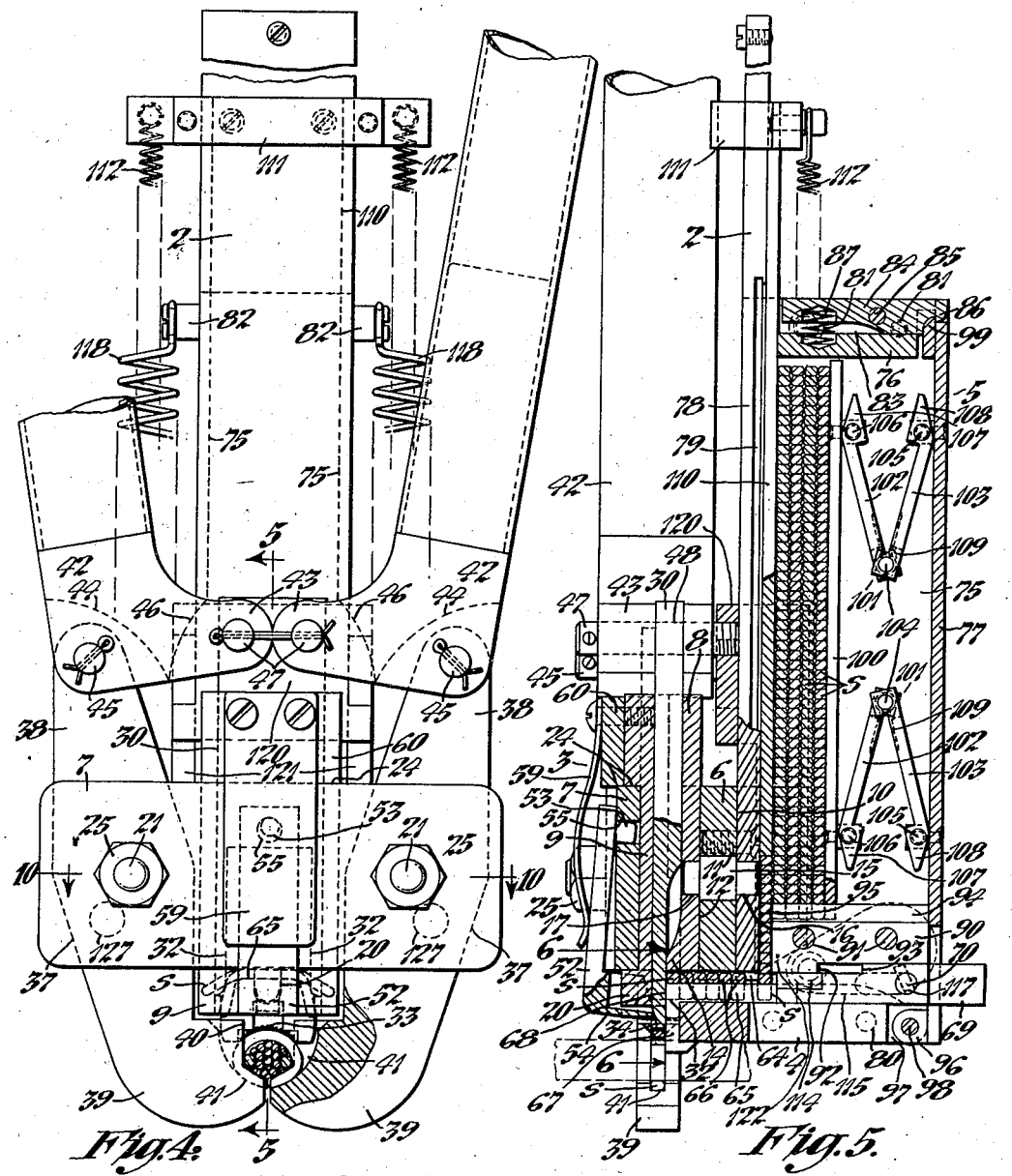
Fig.4. Fig.5.
Fig.6.
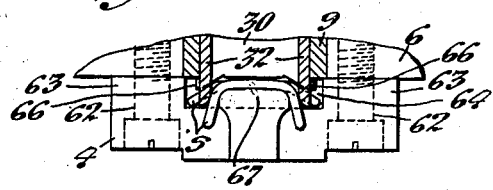
Inventor:
Arthur H. Maynard
By
Attorneys.

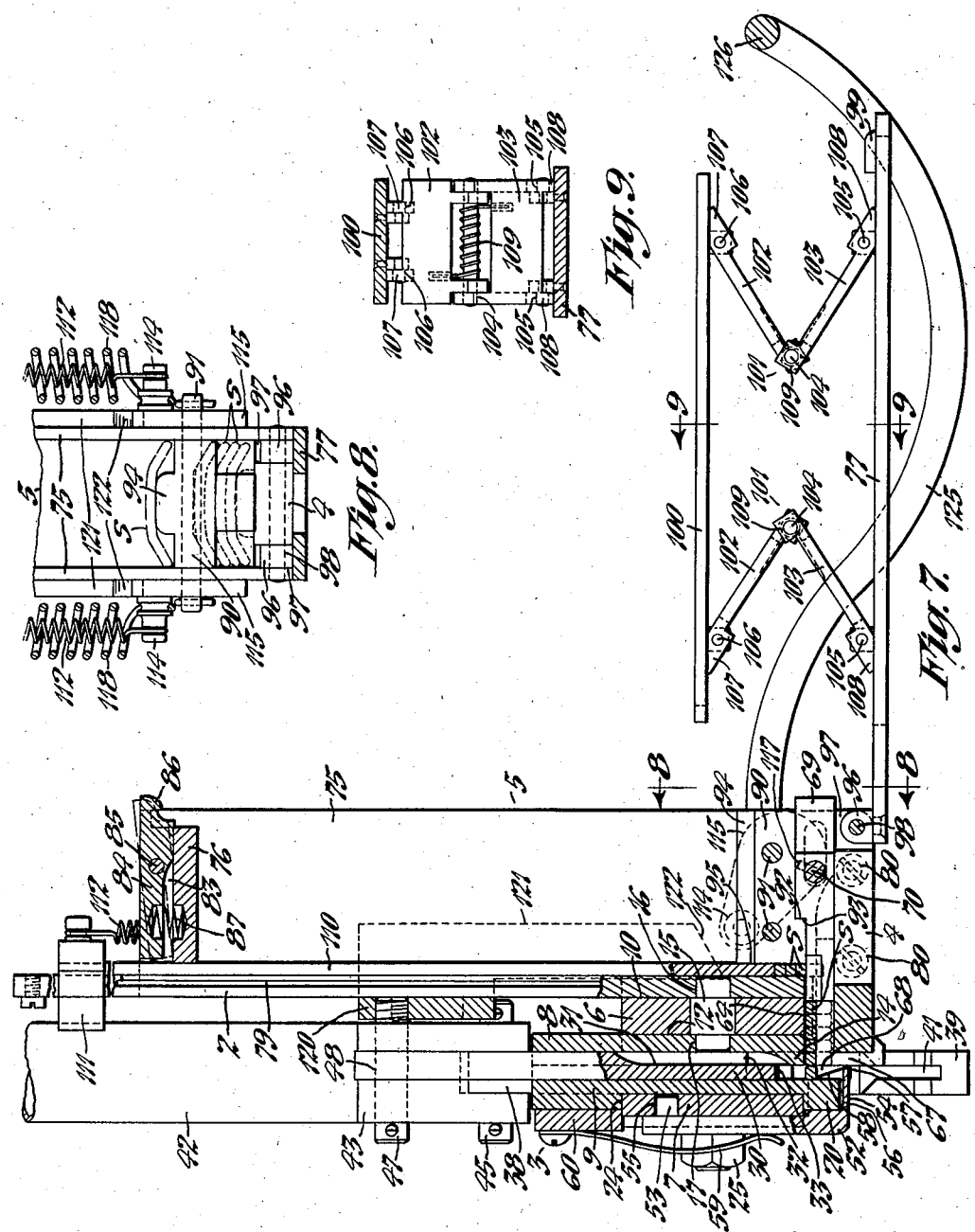

April 2, 1940.  A. H. MAYNARD  2,195,889
FASTENER-APPLYING DEVICE
Filed Dec. 7, 1937  5 Sheets-Sheet 5
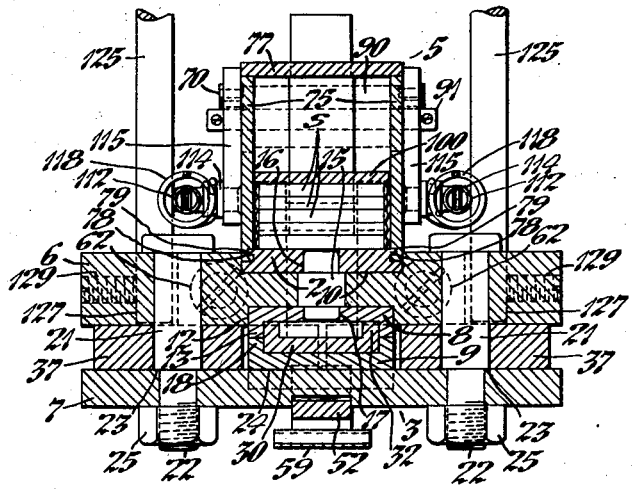
Fig. 10.
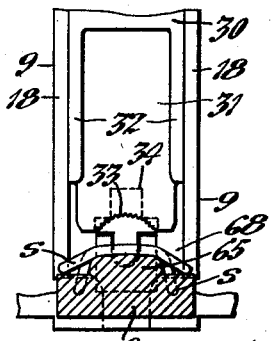
Fig. 11.
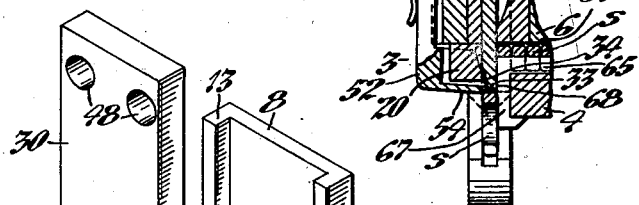
Fig. 12.
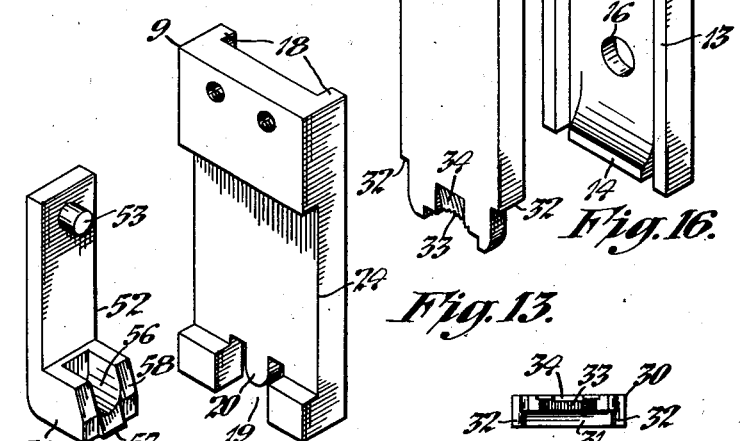
Fig. 13.  Fig. 16.  Fig. 14.
Fig. 15.
Fig. 18.  Fig. 17.
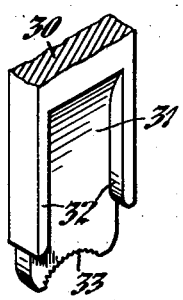
Inventor:
Arthur H. Maynard
By
Attorneys.

Patented Apr. 2, 1940

2,195,889

UNITED STATES PATENT OFFICE 2,195,889

FASTENER-APPLYING DEVICE

Arthur H. Maynard, Warwick, R. I., assignor to Boston Wire Stitcher Company, Warwick, R. I., a corporation of Maine Application December 7, 1937, Serial No. 178,526

27 Claims. (Cl. 140—55)

The present invention relates to improvements in stapling or fastener-applying implements and more particularly to an improved magazine construction for increasing the capacity of the implement, that is the number of fasteners which may be applied thereby without reloading.

One of the objects of the present invention is to provide an implement of the type indicated having a magazine adapted to hold a stack of fasteners nested one within the other in a plane parallel to the throat through which they are driven.

Another object of the invention is to provide an implement of the type indicated having a magazine for holding a supply of preformed fasteners in contiguous side by side and overlying nested relationship.

Another object of the invention is to provide an implement of the type indicated having means for feeding preformed fasteners arranged in contiguous side by side and overlying nested relationship until the entire supply is exhausted.

Another object of the invention is to provide an implement of the type indicated having means for feeding the fasteners from a single stack to the throat through which they are driven and means for successively advancing fresh stacks into position to be operated upon by the feeding means.

Another object of the invention is to provide an implement of the type indicated adapted to hold a supply of partially formed fasteners in nested relationship and to complete the formation of one of the partially formed fasteners while another fastener is being applied to the work.

Another object of the invention is to provide an implement of the type indicated which is of compact form and sturdy construction and adapted to gather together the strands of a reticulated wire mesh and clinch or bind the fasteners around the strands to secure them in place.

Further objects of the invention are set forth in the following specification which describes a preferred form of construction of the device, by way of example, as illustrated by the accompanying drawings. In the drawings:

Fig. 4 is a front elevational view similar to Fig. 2 showing a group of strands of the wire mesh gripped in the jaws of the implement and a driven fastener clinched or bound around the strands;

Fig. 5 is a sectional view on line 5—5 of Fig. 4 showing a supply of fasteners arranged in contiguous side by side and overlying nested relationship in the magazine of the implement and illustrating the manner in which they are fed to the throat through which they are driven;

Fig. 6 is a transverse sectional view on line 6—6 of Fig. 5 showing a fastener with its legs in position to be bent over an anvil to complete its formation prior to the driving operation;

Fig. 7 is a side elevational view of the implement shown partly in section with the door of the magazine open to permit a supply of fasteners to be stacked in the box-like magazine;

Fig. 8 is a transverse sectional view on line 8—8 of Fig. 7 illustrating the manner in which the fasteners are supported in the magazine and the guideway leading to the throat;

Fig. 9 is a transverse sectional view on line 9—9 of Fig. 7 showing the construction of the spring-toggles for mounting the presser-pad on the door of the magazine;

Fig. 10 is a transverse sectional view of the lower part of the implement on line 10—10 of Fig. 4 showing the construction and relationship of the head and magazine;

Fig. 11 is a transverse sectional view on line 11—11 of Fig. 3 showing the bender-bars on the rearward face of the driver for bending the legs of a partially formed fastener to complete its formation;

Fig. 12 is a longitudinal sectional view of a portion of the head showing the supporter holding a fastener after it has been driven to prevent it from being retracted with the driver;

Fig. 13 is a detailed perspective view of the driver viewed from the front;

Fig. 14 is a detailed perspective view of a portion of the driver viewed from the rear and showing the bender-bars projecting rearwardly at the sides thereof;

Fig. 15 is a bottom plan view of the driver showing the relationship of the rearwardly-extending bender-bars with respect to the serrated driving edge;

Fig. 16 is a detailed perspective view of the rearward guide for the driver;

Fig. 17 is a detailed perspective view of the forward guide for the driver; and

Fig. 18 is a detailed perspective view of the fastener-supporter.

Figure 1:
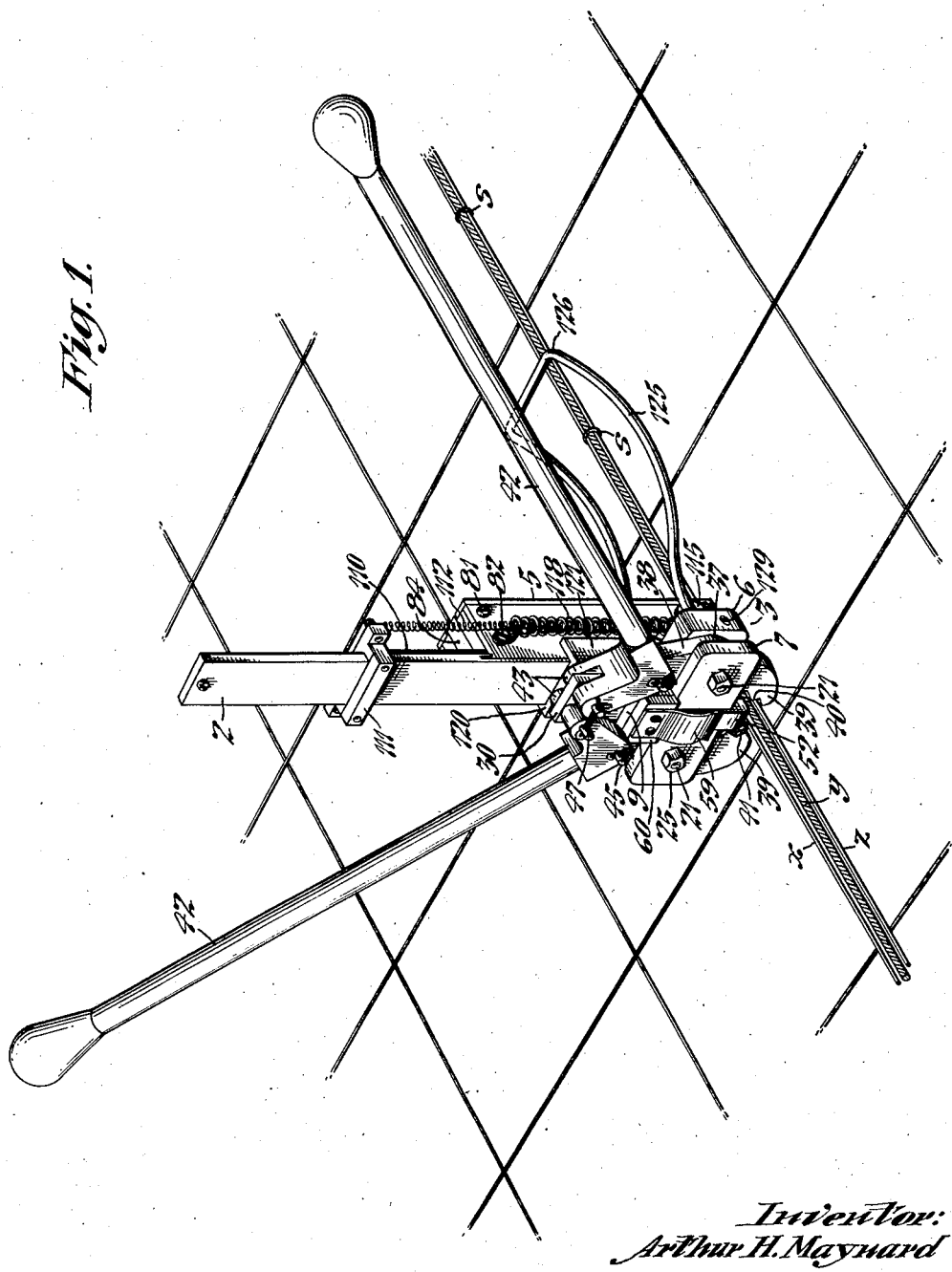
Fig. 1 is a perspective view of a fastener-applying implement incorporating the novel features of the present invention showing it in position to operate upon the strands of a reticulated wire mesh.

The present invention is illustrated in Fig. 1 of the drawings as applied to a machine of the type shown and described in United States Letters Patent No. 2,055,257 for Staple-applying implement, issued September 22, 1936, to Arthur H. Maynard and George H. Harred. The patented implement is adapted to drive U-shaped staples and clinch and bind them around the work. Such implements are particularly adapted for gathering together and connecting the strands $x$, $y$ and $z$ of a reticulated wire mesh used as a grid in the building of dikes, levees or the like to hold the earth work from shifting or sliding. It will be understood, however, that the novel features of the present invention may be applied to other types of implements or to similar implements for applying other forms of fasteners.

Figures 2, 3:
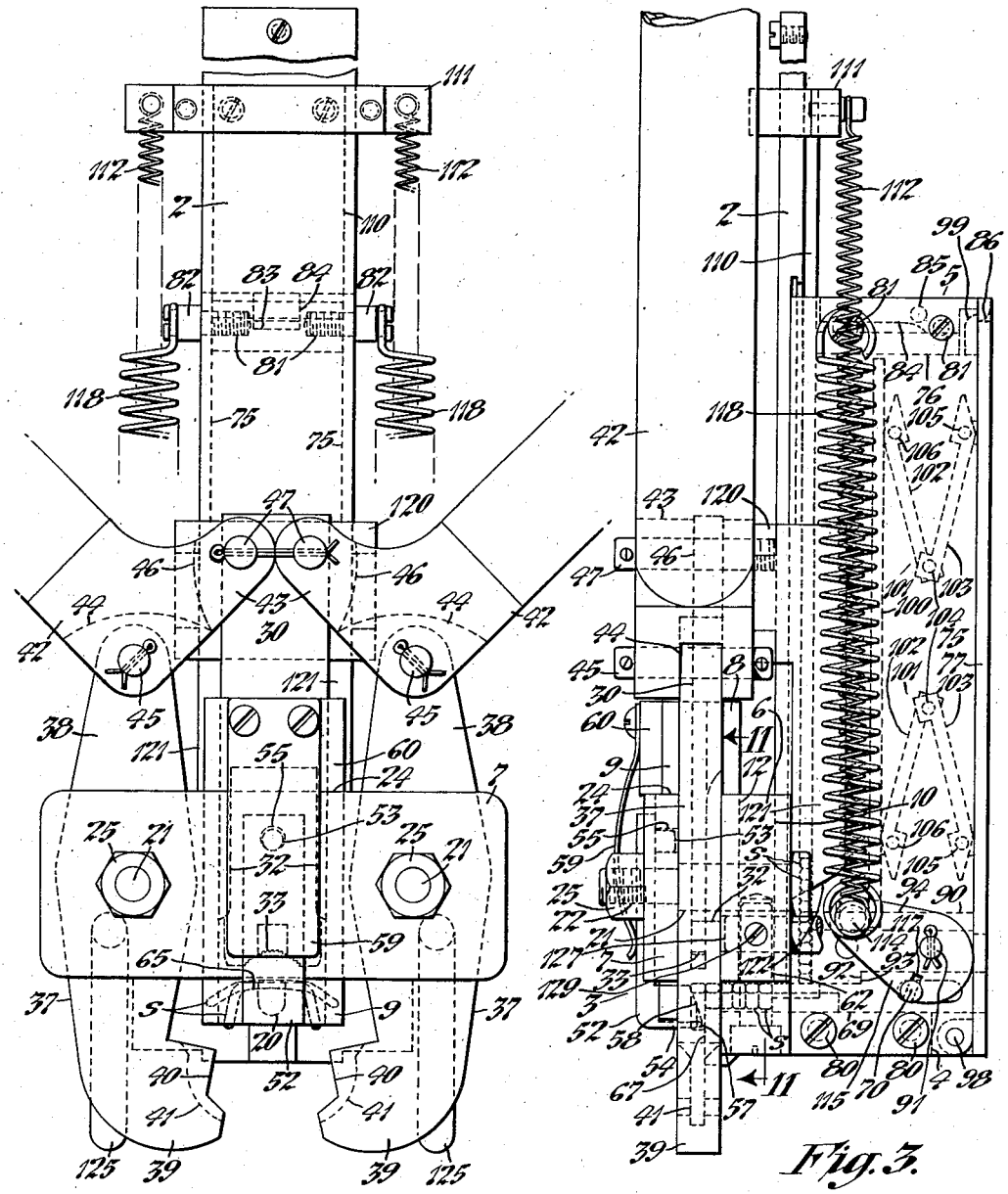
Fig. 2 is an enlarged front elevational view of a portion of the implement shown with its parts in position to receive the work and apply a fastener thereto.
Fig. 3 is a side elevational view of the same.

Referring to the drawings, the implement is herein shown as comprising an upright or stanchion 2 of rectangular outline in cross-section which supports a head 3, a base-block 4 and a magazine 5, see Figs. 3, 5 and 10. The head 3 projects forwardly from the stanchion or upright 2 and comprises a back plate 6 and a front plate 7 with co-operating guide-blocks 8 and 9 clamped therebetween. The back plate 6 extends laterally at opposite sides of the stanchion 2 and has a centrally positioned slot or recess 10 in its rearward face of the same width as the stanchion 2 to adapt it to fit closely around the front and sides thereof. The back plate 6 is attached to the upright or stanchion 2 by means of screws 11, see Fig. 5. A similar recess 12 is provided in the front face of the back plate 6 for receiving the rearward guide-block 8 shown in detail in Fig. 16. Guide-block 8 is of channel form, having forwardly-projecting flanges 13 at its sides and a curved lip 14 adjacent its lower end extending transversely of the flanges and spaced therefrom. The guide-block 8 is held against movement on the back plate 6 by a stud 15 extending through the back plate and having reduced ends projecting into a hole 16 in the stanchion 2 and a hole 17 in the guide-block, see Fig. 10.

The forward guide-block 9, illustrated in detail in Fig. 17, is also of channel form, having rearwardly-extending flanges 18 which cooperate with the flanges 13 on the guide-block 8 to form a rectangular guideway therebetween. At its lower end the front guide-block 9 is slotted to form a rectangular opening 19 with a tongue 20 depending into the opening for a purpose as later explained. The guide-blocks 8 and 9 are clamped between the back plate 6 and front plate 7 by bolts 21 extending through the two plates at opposite sides of the blocks and having reduced threaded ends 22 forming annular shoulders 23. The front plate 7 fits closely within a slot 24 in the front face of the guide-blocks 9 to hold the latter against movement and the plate is clamped against the shoulders 23 on the bolts 21 by means of nuts 25 screwed onto the threaded ends 22.

A staple-driver 30, shown in details in Figs. 13, 14 and 15, is mounted for reciprocation in the rectangular guideway between the guide-blocks 8 and 9, see Fig. 5. As shown most clearly in Fig. 14, the staple-driver 30 is in the form of a bar of generally rectangular outline in cross-section and of such dimension as to fit closely in the guideway between the guide-blocks. Adjacent the lower end of the driver 30 its rearward face is recessed at 31, see Fig. 15, to form rearwardly-projecting flanges or bender-bars 32 which are rounded at their lower ends. The bender-bars 32 terminate above the lower end of the staple-driver 30, the bottom portion of which is of a reduced width and thickness and formed with an arcuate serrated driving edge 33. A beveled recess 34, see Fig. 13, is also provided in the forward face of the staple-driver 30 extending to the driving edge 33.

Cooperating with the staple-driver 30 are a pair of clinching levers 37, see Fig. 2, pivoted intermediate their ends on the bolts 21 and positioned between the back plate 6 and front plate 7. The levers 37 project from opposite sides of the bolts 21 to provide upwardly-extending arms 38 and dependent jaws 39. The jaws 39 have their inner faces cut back as indicated at 40 to adapt them to cooperate to form a pocket therebetween as shown in Fig. 4. The inner faces of the jaws 39 are also slotted to form generally circular clinching grooves 41.

The staple-driver 30 and the jaws 39 are operated simultaneously by means of a pair of hand-levers 42 having inwardly-directed toe-like bearing portions 43. Each of the hand-levers 42 is slotted at 44 to receive the end of one of the upwardly-extending arms 38 of a clinching lever 37 and the arm and lever are pivotally connected by a clevis-pin 45. The inwardly-directed portions 43 of the levers 42 are also slotted at 46 to receive the upper end of the staple-driver 30 which is connected thereto by clevis-pins 47 extending through the levers and holes 48 in the driver. Thus, as the hand-levers 42 are rocked from the position illustrated in Fig. 2 to that illustrated in Fig. 4 the staple-driver is moved downwardly in the guideway between the guide-blocks 8 and 9 and the arms 38 of the clinching levers 37 are moved outwardly to swing the jaws 39 inwardly toward each other below the staple-driver.

A staple-supporter 52, illustrated in detail in Fig. 18, is pivotally mounted on the front plate 7, see Figs. 2, 3 and 5. The staple-supporter 52 is in the form of a lever having a rearwardly-projecting pivot-pin 53 at its upper end and a rearwardly-projecting toe 54 at its lower end. The pin 53 enters a hole 55 in the front plate 7 with a loose fit to mount the supporter in position with its toe 54 projecting rearwardly through the rectangular opening 19 at the lower end of the guide-block 9. To provide a clearance for the depending tongue 20 the toe 54 is formed at the top with a circular recess 56. The rearward face of the toe 54 is inclined or beveled to provide a cam-face 58 engageable by the staples $s$ and the bottom portion of the toe is cut back at opposite sides to provide a rearwardly-projecting lug 57 of a contour corresponding to the recess 34 in the front face of the driver 30. A leaf-spring 59 is attached at its upper end to a spacer-plate 60 screwed to the front face of the guide-block 9, the lower end of the spring engaging the staple-supporter 52 to yieldingly press it rearwardly to position its cam-face 58 at the rear of the guide-block 9 whereof to support a staple $s$ in the manner as later more fully explained.

The base-block 4 underlies the stanchion 2 and a portion of the head 3 and is attached to the back plate 6 of the head 3 by means of screws 62, see Figs. 3 and 6. As illustrated most clearly in Fig. 6, the base-block 4 is of U-shape in outline having short legs or bosses 63 which abut the bottom faces of the back plate 6, guide-block 8 and stanchion 2 to form an opening or guide-way 64. Integrally formed with the base-block 4 is a core 65, see Figs. 5 and 11, for supporting partially formed staples s centrally in the guideway 64. The back plate 6 and stanchion 2 have depending flanges 66, shown in Fig. 6, which overlie the core 65 to hold the partially formed staples s properly positioned thereon. The core 65 projects forwardly beyond the end of the base-block 4 and constitutes an anvil 67 over the sides of which the legs of the staple s are bent to complete their formation prior to being driven. The base-block 4 is so positioned with respect to the head 3 that the forward end of the anvil 67 is spaced from the depending tongue 20 on the guide-block 9 to form a guide-slot or throat 68 through which the staples are driven, the throat being alined with the clinching grooves 41 in the jaws 39. A pusher 69 of generally U-shape outline is straddled across the core 65 and carries a cross-pin 70 by which it is connected to be reciprocated in the manner as later more fully explained.

The magazine 5, to which the present invention particularly relates, comprises a box-like casing having spaced side walls 75 attached to the sides of the upright or stanchion 2, a top wall 76 and a hinged cover or door 77 at its rearward side. As illustrated most clearly in Fig. 10, the upright or stanchion 2 is provided at its opposite sides with tongues 78 which interlock with grooves 79 on the inside faces of the side walls 75 of the magazine adjacent their forward edges. The stanchion 2 and forward edges of the side walls 75 closely fit within the recess 10 at the rear of the back plate 6 which serves to hold the parts in assembled relationship. The side walls 75 of the magazine are attached to the sides of the base-block 4 at their lower ends by means of screws 80, see Fig. 3. The top wall 76 of the magazine is attached to the upper end of each side wall 75 by a pair of screws 81 which extend through the side walls and are screwed into the sides of the top wall. The foremost screw 81 at each side of the magazine has an enlarged head 82 which projects laterally for a purpose as later explained. The top wall 76 is centrally slotted parallel to the side walls 75 to form a recess 83 in which a latch-member 84, see Fig. 7, is mounted for pivotal movement on a pin 85 extending across the recess. A detent-shoulder 86 is provided at the rearward end of the latch-member 84, the latch being operated by a spring 87, see Fig. 5, to engage the shoulder with a catch 99 on the door 77.

A supporting block 90 is mounted between the side walls 75 of the magazine casing adjacent the bottom thereof by means of studs 91 extending through the walls and block, see Fig. 5. The block 90 overlies the pusher 69 and is recessed on its under side to form a shoulder 92 engageable by a shoulder 93 on the pusher to limit the forward movement of the latter. The upper face of the block 90 is provided with a core 94, similar in shape to the core 65, for supporting partially formed staples s in the magazine, see Fig. 8. The forward end of the block 90 is spaced from the rearward face of the upright or stanchion 2 a distance equal to the width of a staple s to provide a slot 95 through which the staples are fed from the magazine to the guideway 64, see Fig. 5.

The magazine 5 is adapted to support the staples s in contiguous side by side and overlying relationship to form a plurality of vertical columns or stacks, see Fig. 5. As shown in Figs. 8 and 11, the staples s are initially only partially formed, their legs being inclined outwardly so that they may be nested one within the other. Preferably, the partially formed staples or blanks are assembled in "sticks" or refills with the staples of each stick nested one within the other in vertical alinement and held together by a suitable adhesive. The magazine 5 is loaded while the door 77 is open by inserting a number of the sticks in parallel side by side relationship as illustrated in Fig. 5. The magazine is thus adapted to hold a plurality of sticks instead of a single stick as in the usual practice.

The cover or door 77 is of such dimensions as to entirely close the rearward side of the magazine 5. At the lower end of the door 77 are ears 96, see Figs. 5 and 7, which project into openings 97 in the rearward side of the base-block 4 and are journaled on a cross-pin 98 for hingedly mounting the door. The door 77 is thus mounted to swing from its closed position illustrated in Fig. 3 to its open position illustrated in Fig. 7, the catch nosing 99 at its upper end cooperating with the latch-shoulder 86 to hold the door closed.

A spring-pressed pad 100 is mounted on the inside face of the door 77 to adapt it to bear against the rearmost stack of staples s to successively advance the stacks or "sticks" to a feeding means as later explained. The pad 100 is in the form of a rectangular plate of substantially the same dimensions as the inside of the magazine 5 and is connected to the door 77 by a pair of toggles 101. Each toggle 101 is comprised of a pair of articulated lever-arms 102 and 103 pivotally connected to each other at their inner ends by a pin 104 and to the door 77 and pad 100, respectively, at their outer ends by pins 105 and 106, see Figs. 7 and 9. As illustrated in Fig. 9, the lever-arms 102 and 103 are in the form of flat plates having ears 107 and 108 projecting from their opposite edges through which the pins 104, 105 and 106 extend; the ears 108 at the outer ends of the arms having inclined faces for engaging the sides of the door and pad to limit the movement of the pad with respect to the door. The opposite lever-arms 102 and 103 of each toggle 101 are resiliently urged toward an open or straight-line position by a spring 109 coiled about the pin 104 and engaging the arms whereby to cause the pad 100 to be pressed forwardly from the door 77, see Fig. 5.

The foremost stack of the staples s is fed downwardly in the magazine 5 to project the staples through the slot 95 into the guideway 64 by means of a follower 110, see Fig. 5. The follower 110 is in the form of a flat plate of a width and thickness corresponding to the length and thickness of a staple s and is adapted to slide in the magazine 5 adjacent the rearward face of the stanchion or upright 2. The lower end of the follower 110 is of a shape corresponding to the upper portion of the partially formed staple s to adapt it to bear against the uppermost staple in the foremost stick in the magazine 5. The follower 110 is guided in its sliding movement by a cross-arm or bracket 111 which closely embraces the forward face and the sides of the upright or stanchion 2 with its ends projecting laterally from the opposite sides thereof, see Fig. 2. Coiled springs 112 connected to the laterally-extending ends of the bracket 111 are anchored to studs 114 projecting from rockable levers 115 at the lower end of the magazine 5, see Fig. 3. The springs 112 act to slide the follower 110 downwardly to feed the foremost stack of staples s downwardly in the magazine 5. Thus the staples s in the foremost stack are fed downwardly through the slot 95 into the guideway 64 until the supply in one stack is exhausted and after the follower 110 is raised the pad 100 acts to advance another succeeding stack into position to be engaged by the follower.

The rockable levers 115 are pivotally mounted on the opposite projecting ends of the rearward stud 91 extending through the supporting block 90 and side walls 75 of the magazine 5, see Fig. 8. The levers 115 are formed with slots 117 in their edges which engage the tongued ends of the pin 70 which is pivoted in the pusher 69 with its ends projecting laterally from its sides. The levers 115 are yieldingly rocked to the position illustrated in Fig. 3 by the coil-springs 112 attached to the studs 114, previously referred to, and the force of these springs is augmented by auxiliary springs 118 which surround the first-mentioned springs. The springs 118 are connected to the studs 114 at their lower ends and hooked around the grooved heads 82 of the screws 81 which project laterally from the side walls 75 of the magazine 5.

The levers 115 are rocked on their pivot 91 against the action of the springs 112 and 118 by a cam-plate 120 of U-shape construction which embraces the forward face and the sides of the upright or stanchion 2 above the back plate 6, see Figs. 3 and 7. The sides 121 of the cam-plate 120 extend downwardly at the sides of the magazine 5 and their lower ends are beveled or inclined as illustrated at 122 in Fig. 3. The pins 47 which pivotally connect the hand-levers 42 to the staple-driver 30 have rearwardly-extending threaded ends which are screwed into the cam-plate 120 to connect the latter to the staple-driver for movement therewith.

The implement is supported from its base to hold it in an upright position by means of a skid 125. The skid 125 is in the form of a U-shaped loop formed from round rod and generally curved or bowed downwardly from its outer end 126 toward the head of the implement. The forwardly-projecting free ends 127 of the skid are received in holes in the back plate 6 and are fixedly secured therein by set-screws 129. The invention having now been described as embodied in a preferred form of construction, its mode of operation will next be explained.

The implement is prepared for operation by loading the magazine 5 with a supply of the staples s. To this end the door 77 is opened by depressing the forward end of the latch-member 84 to release its shoulder 86 from engagement with the catch 99, whereafter the door is swung on its hinge 98 to the position shown in Fig. 7. A number of sticks of the partially formed staples s are then placed vertically in the box-like magazine 5 in parallel contiguous relationship as illustrated in Fig. 5. After the magazine has been filled the door is closed, the catch 99 sliding under the latching shoulder 86 and thereafter engaging the same to latch the door in closed position. As the door is swung to its closed position the presser-pad 100 engages the rearmost stick of staples in the magazine and is pressed rearwardly toward the door against the yielding action of the spring-pressed toggles 101.

The follower 110 is raised manually by gripping the laterally-extending ends of the bracket 111 and sliding it upwardly on the stanchion 2. As the lower end of the follower 110 is moved above the uppermost staple in the foremost stack the presser-pad 100 is moved forwardly by the toggles 101 to position the foremost stack of staples beneath the end of the follower.

The hand-levers 42 are operated several times initially to transfer staples s from the magazine to fill the guideway 64. As the levers 42 are swung inwardly toward each other the clinching levers 37 are moved to their closed position and the staple-driver 30 moved downwardly as illustrated in Fig. 4. The cam-plate 120, attached to the staple-driver 30 by the clevis-pins 47, moves downwardly with the staple-driver 30 to engage the beveled ends 122 with the forward ends of the rockable levers 115. The continued movement of the cam-plate 120 thus causes the levers 115 to be rocked on the pivot-pin 91 in a counter-clockwise direction as viewed in Fig. 5. The engagement of the laterally-projecting ends of the cross-pin 70 on the pusher 69 with the slots 117 in the levers 115 causes the pusher to be retracted to the position shown in Fig. 5. The follower 110 which is resiliently pressed against the top of the foremost stack of staples s under the action of the springs 112 causes the stack to be moved vertically in alinement with the slot 95 to advance the lowermost staple s into the guideway 64 in advance of the pusher 69. As the hand-levers 42 are swung outwardly away from each other the staple-driver 30 is raised and the clinching levers 37 swung to their open position illustrated in Fig. 2. The cam-plate 120 is raised simultaneously with the staple-driver 30 to release the rockable levers 115 and the springs 112 and 118 connected to the studs 114 cause the levers 115 to be rocked in a clockwise direction to the position illustrated in Fig. 3. The rocking movement of the levers 115 thus moves the pusher 69 forwardly to cause it to shear the lowermost staple from the remainder of the stick and advance it into the guideway 64; the forward movement of the pusher being limited by the engagement of its shoulder 93 with the shoulder 92 on the supporting block 90. The above described operation is continued until a sufficient number of staples s have been advanced into the guideway 64 to position a staple on the anvil 67 at the forward end of the core 65.

During the next operation of the hand-levers 42 the bender-bars 32 which project rearwardly from the driver 30 engage the outwardly-inclined legs of the partially formed staple s and fold them downwardly over the sides of the anvil 67 to complete the formation of the staple in the manner as indicated in Fig. 6. The pusher 69 is thereafter actuated through a rearward and forward stroke to shear another staple s from the bottom of the stick, and acting against the staples in the guideway 64, it advances the formed staple into the throat 68 below the serrated end 33 of the driver 30. It will be noted from the showing in Fig. 11 that the ends of the legs of the partially formed staples engage the flanges 18 on the depending lower end of the guide-block 9, thereby preventing the staples from entering the throat 68 until their legs have been bent to complete the formation. The foremost staple s at this juncture is straddled on the rearwardly-projecting toe 54 of the staple-supporter 52 with its crossbar overlying the inclined cam-face 58.

The implement is then ready for a staple-applying operation when placed on the reticulated wire mesh in the position indicated in Fig. 1. When the hand-levers 42 are again operated the clinching jaws 39 first act to gather together the strands x, y and z to be connected and to grip them in the pocket formed by the opposite recessed portions 40 of the jaws as illustrated in Fig. 4. Simultaneously with the gripping of the strands the staple-driver 30 is moved downwardly to drive the staple s through the throat 68 and into the clinching grooves 41 of the jaws 39. The simultaneous driving and bending force is thus applied to the staple to bend its legs around and bind them against the strands in the manner illustrated in Fig. 4. It will be understood that while the formed staple s is being driven its crossbar slides downwardly on the cam-face 58 of the supporter 52 to retract the latter as the spring 59 yields. After the staple s has been driven down beyond the end of the supporter 52 the lug 57 on the latter snaps into the recess 34 in the front face of the driver 30 to prevent the driven staple from being retracted with the driver should the implement be operated with no work in the jaws 39. During the driving of the formed staple s the next adjacent staple in the guideway 64 and overlying the anvil 67 is engaged by the bender-bars 32 to complete its formation. Thus the hand-levers 42 may be successively operated to drive and clinch a plurality of staples s until all those in the foremost stack in the magazine are exhausted.

The follower 110 is then raised in the manner as previously explained by merely gripping the bracket 111 and sliding it upwardly on the stanchion 2. The presser-pad 100, under the action of the spring-pressed toggles 101, then acts automatically to advance the entire supply of staples forwardly in the magazine to position the foremost stack beneath the end of the follower 110. Thereafter, the pusher 69 will act to progressively shear the endmost staples s from the foremost stick and advance them through the guideway 64 into the throat 68 as the follower 110 functions to successively advance the staples through the slot 95 and into the guideway 64. When the entire supply of staples has been exhausted the magazine 5 is opened by releasing the latch-member 84 and swinging the door 77 to the position illustrated in Fig. 7 so that another supply of staples may be inserted into the magazine.

It will be observed from the foregoing that the present invention provides an improved means for supplying fasteners and feeding them to the work to increase the capacity of the implement whereof to avoid frequent reloading of its magazine. It will also be observed that the improved form of magazine is adapted to hold the staples arranged in contiguous side by side and overlying relationship to conserve space and render the implement of compact structure. It will further be observed that the implement is of sturdy construction to adapt it for use over long periods of time without repair or replacement of its parts.

While I have herein shown and described one preferred embodiment of the implement it is to be understod that various modifications may be made in the structure and arrangement of its parts without departing from the spirit or scope of the invention. For example, the staples may be joined in parallel side by side relationship to form a preformed stick in horizontal arrangement with the plurality of sticks nested one over the other instead of in vertical arrangement in side by side relationship as illustrated in the present drawings. Therefore, without limiting myself in this respect, I claim:

1. In a device of the type indicated, the combination of fastener-applying means, a magazine for fasteners having crossbars and opposite legs projecting at obtuse angles to the crossbars, means in the magazine for supporting a stack of the fasteners nested one above another in closely adjacent relationship with their legs in a common plane, means in the magazine for positively feeding the fasteners in the plane in which they are stacked, and means for successively transferring the endmost fastener from the stack to the fastener-applying means.

2. In a device of the type indicated, the combination of fastener-applying means having a throat through which the fasteners are driven and a driver reciprocable in said throat, a magazine for fasteners having crossbars with opposite legs projecting therefrom at obtuse angles thereto, means in the magazine for supporting a stick of the fasteners nested one within another in closely adjacent relationship with their legs in a common plane, a guideway leading from the magazine to the fastener-applying means, means in the magazine for positively feeding the stick of fasteners toward the guideway, and means for successively transferring the endmost fastener in the stick through the guideway to the fastener-applying means.

3. In a device of the type indicated, the combination of fastener-applying means having a throat through which the fasteners are driven and a driver reciprocable in said throat, a magazine for fasteners having crossbars with opposite legs projecting therefrom at obtuse angles thereto, means in the magazine for supporting a supply of the fasteners nested one above another in vertical arrangement to form a stack with their legs in a common plane, a guideway leading from the magazine to the fastener-applying means, means in the magazine for positively feeding the fasteners to the guideway in the plane in which they are stacked, and means movable at right-angles to the feeding means for transferring the fasteners through the guideway to the fastener-applying means.

4. In a device of the type indicated, the combination of fastener-applying means having a throat through which the fasteners are driven and a driver reciprocable in said throat, a magazine, means in the magazine for supporting a self-sustained stick of preformed fasteners having crossbars with opposite legs projecting therefrom at obtuse angles thereto nested one within another in vertical arrangement and joined to each other by an adhesive, a guideway leading from the magazine to the fastener-applying means, a follower in the magazine acting on the stick to successively feed the fasteners to the guideway, and a reciprocable pusher in the guideway for successively shearing the endmost fastener from the stick and advancing it toward the fastener-applying means.

5. In a fastener-applying device, the combination of a head having a throat through which the fasteners are driven, a driver in said throat, a cam movable downwardly with the driver, a magazine, means in the magazine for supporting a stack of fasteners in nested relationship with their legs parallel to the throat, means for successively feeding the fasteners from the stack, and means operated by the cam movable with the driver for transferring the fasteners to the throat.

6. In a fastener-applying device, the combination of a head having a throat through which the fasteners are driven and a guideway leading to the throat, a driver in the throat, a magazine for fasteners having crossbars with opposite legs projecting therefrom at obtuse angles thereto, means in the magazine for supporting a stack of the fasteners nested one within the other with their legs parallel to the throat, means in the magazine for positively feeding the fasteners from the magazine to the guideway, a pusher, and means movable downwardly with the driver for actuating the pusher to successively transfer the fasteners from the stack through the guideway to the throat.

7. In a fastener-applying device, the combination of a head having a throat through which fasteners are driven and a guideway leading into the throat, a driver in the throat, a magazine for fasteners having crossbars with opposite legs projecting therefrom at obtuse angles thereto, means in the magazine for supporting a supply of the fasteners nested one within another in a plane parallel to the throat and joined to each other to form a self-sustained stick, a follower in the magazine for successively feeding the fasteners into the guideway, a reciprocable pusher in the guideway for shearing the endmost fastener from the stick and advancing it toward the throat, and means directly connected to the driver for reciprocating the pusher in timed relation to the movement of the driver.

8. In a fastener-applying device, the combination of a head having a throat and a guideway leading to the throat, a driver in the throat, a magazine, means in the magazine for supporting a stick of fasteners nested one within another with their legs in a common plane parallel to the throat, a follower in the magazine for advancing the fasteners into the guideway, a pusher in the guideway, a rockable member connected to reciprocate the pusher to successively shear the endmost fastener from the stick and advance it in the guideway toward the throat, means carried by the driver for actuating the rockable member in one direction, and a spring for operating the rockable member in the opposite direction.

9. In a fastener-applying device, the combination of a head having a throat through which the fasteners are driven and a guideway leading to the throat, a driver in the throat having means for forming the fasteners, a magazine for partially formed fasteners having crossbars and opposite legs projecting therefrom at obtuse angles thereto, means in the magazine for supporting the partially formed fasteners nested one within the other in a stack in a plane parallel to the throat, means in the magazine for positively feeding the fasteners from the magazine to the guideway, and means for advancing the fasteners through the guideway to the throat, said driver being adapted to simultaneously drive a formed fastener and form another fastener in the guideway.

10. In a device of the type indicated, the combination of fastener-applying means, a magazine for holding a supply of fasteners in contiguous side by side and overlying relationship, and means for successively feeding the fasteners from the magazine to the fastener-applying means until the supply is exhausted.

11. In a device of the type indicated, the combination of fastener-applying means, a magazine having a single chamber for holding a plurality of stacks of nested fasteners arranged in parallel and contiguous relationship, and means for successively feeding the fasteners from the magazine to the fastener-applying means until the supply is exhausted.

12. In a device of the type indicated, the combination of fastener-applying means, a magazine having a single chamber for holding a supply of fasteners in parallel contiguous relationship in both horizontal and vertical planes, and means for successively feeding the fasteners from the magazine to the fastener-applying means until the supply is exhausted.

13. In a device of the type indicated, the combination of fastener-applying means, a magazine having a single chamber for holding a plurality of fasteners arranged in contiguous side by side and overlying relationship to form a series of rows, means for successively feeding the fasteners of one row from the magazine to the fastener-applying means, and means for successively advancing the rows of fasteners to the feeding means.

14. In a device of the type indicated, the combination of fastener-applying means, a magazine having a single chamber for holding a plurality of sticks of preformed fasteners arranged in parallel rows, means for feeding the fasteners from one row in the magazine to the fastener-applying means, and means in the magazine for successively advancing the rows of fasteners to the feeding means.

15. In a device of the type indicated, the combination of fastener-applying means, a magazine having a single chamber for holding a plurality of stacks of nested fasteners, means for feeding the fasteners from one stack in the magazine to the fastener-applying means, and means for successively advancing the stacks of fasteners to the feeding means.

16. In a device of the type indicated, the combination of fastener-applying means, a magazine having a single chamber for holding a plurality of sticks of fasteners arranged in parallel relationship, a guideway leading from the magazine to the fastener-applying means, a follower for successively feeding the fasteners of one stick into the guideway, a pusher in the guideway for successively shearing the endmost fasteners from the stick and advancing them through the guideway toward the fastener-applying means, and means in the magazine for successively advancing the sticks of fasteners into position to be engaged by the follower.

17. In a device of the type indicated, the combination of fastener-applying means, a box-like magazine for holding a plurality of sticks of nested fasteners, a guideway leading from the magazine to the fastener-applying means, a follower in the magazine for advancing the innermost stick of fasteners into the guideway, a pusher in the guideway for transferring the fasteners to the fastener-applying means, and resiliently-operated means in the magazine adapted to bear against the sticks to successively advance them into alinement with the follower.

18. In a device of the type indicated, the combination of fastener-applying means, a box-like magazine for holding a plurality of sticks of nested fasteners in parallel relationship, a door for opening the magazine to adapt it to be loaded with the sticks of fasteners, a guideway leading from the magazine to the fastener-applying means, a follower in the magazine for advancing the fasteners of the innermost stick into the guideway, a pusher in the guideway for transferring the fasteners to the fastener-applying means, and resiliently-operated means in the magazine adapted to bear against the sticks to successively advance them into alinement with the follower.

19. In a device of the type indicated, the combination of fastener-applying means, a magazine having a single chamber for holding partially formed fasteners in contiguous side by side and overlying nested relationship, means for successively feeding the fasteners from the magazine to the fastener-applying means until the supply is exhausted, and forming means for bending the partially formed fasteners to complete their formation prior to being applied to the work.

20. In a fastener-applying device, the combination of a head having a throat through which the fasteners are driven, a driver reciprocable in said throat, an anvil, means carried by the driver for forming the fasteners, a magazine for holding partially formed fasteners, means for supporting said fasteners in overlying stacked relationship in the magazine, and means for successively feeding the partially formed fasteners from the magazine to the throat, said driver being adapted to drive a formed fastener and complete the formation of another fastener by bending it over the anvil.

21. In a fastener-applying device, the combination of a head having a throat through which the fasteners are driven, a driver adapted to be reciprocated in said throat, said driver having means for forming the fasteners, an anvil, a magazine for holding a plurality of parallel stacks of partially formed fasteners with the fasteners of each stack nested one within another, a follower in said magazine for successively advancing the stacks of fasteners, and a pusher for transferring the fasteners from the stacks to the throat, said driver being adapted to drive a formed fastener and complete the formation of another fastener by bending it over the anvil.

22. In a device of the type indicated, the combination of a frame, clincher-jaws mounted on the frame for swinging movement to closed position, a magazine having a single chamber for holding fasteners in contiguous side by side and overlying nested relationship, means for feeding the fasteners from the magazine to the clincher-jaws, and means for actuating the clincher-jaws to clinch the fasteners around the work.

23. In a device of the type indicated, the combination of a head, a staple-driver in said head, a magazine for holding staples in contiguous side by side and overlying nested relationship, means for feeding the staples from the magazine to the head until the supply is exhausted, clinching levers mounted on the head intermediate their ends and having depending jaws adapted to swing to closed position below the staple-driver, and hand-levers directly connected to the clinching levers and staple-driver for simultaneously actuating the staple-driver to drive a staple and swing the clincher-jaws into closed position.

24. In a device of the type indicated, the combination of a head having a throat through which the staples are driven and a guideway leading to the throat, a staple-driver in said throat, a magazine for holding a plurality of parallel stacks of nested staples, a follower in the magazine for successively advancing the staples from the stacks into the guideway, a pusher in the guideway for advancing the staples to the throat, clincher-jaws mounted on the head for swinging movement to closed position below the staple-driver, and manually-operated hand-levers for simultaneously actuating the staple-driver, clincher-jaws and pusher.

25. In a device of the type indicated, the combination of a magazine for holding fastener-blanks having crossbars and opposite legs projecting therefrom at obtuse angles thereto, means for feeding the blanks in the same direction as that in which the fasteners are to be applied, means for bending the blanks to form them into fasteners, and a driver for driving the formed fasteners.

26. In a device of the type indicated, the combination of a magazine for holding fastener-blanks having crossbars and opposite legs projecting therefrom at obtuse angles thereto, means for supporting the blanks in the magazine in a plane parallel to the direction in which the fasteners are to be applied, means for feeding the blanks toward the fastener-applying means, means for bending the blanks to form fasteners, and means for driving and clinching the formed fasteners.

27. In a device of the type indicated, the combination of fastener-applying means, a magazine for holding a supply of fastener blanks having crossbars and opposite legs projecting therefrom at obtuse angles thereto with the blanks in contiguous side by side and overlying nested relationship, means for successively feeding the fastener blanks from the magazine toward the fastener-applying means, and means for bending the blanks to form the fasteners before they are applied.

ARTHUR H. MAYNARD.